(12) United States Patent
Benjamin et al.

(10) Patent No.: US 8,453,130 B2
(45) Date of Patent: May 28, 2013

(54) MEMORY MANAGEMENT FOR OBJECT ORIENTED APPLICATIONS DURING RUNTIME

(75) Inventors: Priya B. Benjamin, Aurora, IL (US); David N. Brauneis, Jr., Raleigh, NC (US); Jared P. Jurkiewicz, Durham, NC (US); Radoslava G. McDougald, Durham, NC (US); Polyxeni Mountrouidou, Athens (GR)

(73) Assignee: International Business Machines Corporation, Armonk, NY (US)

(*) Notice: Subject to any disclaimer, the term of this patent is extended or adjusted under 35 U.S.C. 154(b) by 284 days.

(21) Appl. No.: 13/023,649

(22) Filed: Feb. 9, 2011

(65) Prior Publication Data

US 2012/0203972 A1 Aug. 9, 2012

(51) Int. Cl.
*G06F 9/45* (2006.01)
*G06F 9/44* (2006.01)

(52) U.S. Cl.
USPC .......................... 717/148; 717/116; 717/158

(58) Field of Classification Search
None
See application file for complete search history.

(56) References Cited

U.S. PATENT DOCUMENTS

| | | | |
|---|---|---|---|
| 5,704,060 A | 12/1997 | Del Monte | |
| 6,728,852 B1* | 4/2004 | Stoutamire | 711/170 |
| 6,836,879 B1* | 12/2004 | Myers | 717/116 |
| 7,085,789 B1 | 8/2006 | Tarditi | |
| 7,107,426 B2 | 9/2006 | Kolodner et al. | |
| 7,596,569 B2 | 9/2009 | Bacon et al. | |
| 7,913,240 B2* | 3/2011 | Kielstra et al. | 717/148 |
| 8,214,812 B2* | 7/2012 | Romanovskiy | 717/148 |
| 2004/0194076 A1* | 9/2004 | Comp et al. | 717/158 |
| 2006/0179428 A1* | 8/2006 | Kawachiya et al. | 717/148 |
| 2006/0253844 A1* | 11/2006 | Holt | 717/148 |
| 2008/0065664 A1 | 3/2008 | Kehn et al. | |

FOREIGN PATENT DOCUMENTS

WO WO 9857258 A2 * 12/1998

OTHER PUBLICATIONS

Carl A. Waldspurger, "Proceedings of the 5th Symposium on OS Design and implementation", USENIX Association., Dec. 9-11, 2002, 15 pages, <http://www.vmware.com/pdf/usenix_resource_mgmt.pdf>.*
Eric C. R. Hehner, "Computer Design to Minimize Memory Requirements", University of Toronto, Aug. 1976, 6 pages, <http://ieeexplore.ieee.org/stamp/stamp.jsp?tp=&arnumber=1647452&tag=1>.*
K.Geetha, "Compressed Instruction Set Coding (CISC) for Performance Optimization of Hand Held Devices", ADCOM, 2008, 7 pages, <http://ieeexplore.ieee.org/stamp/stamp.jsp?tp=&arnumber=4760455>.*

(Continued)

*Primary Examiner* — Thuy Dao
*Assistant Examiner* — Khanh Dang
(74) *Attorney, Agent, or Firm* — Cantor Colburn LLP; Prentiss Johnson (57) ABSTRACT

Memory management for object oriented applications during run time includes loading an object oriented application into a computer memory. The object oriented application includes a plurality of nodes in a classification tree, the nodes including key value pairs. The nodes are aggregated in the classification tree by a computer. The aggregating includes eliminating redundant keys and creating a composite node. The composite node is loaded into the computer memory. The plurality of nodes in the classification tree are removed from the computer memory in response to loading the composite node into the computer memory.

18 Claims, 3 Drawing Sheets

OTHER PUBLICATIONS

Xinfeng Liw, "Solaris Application Memory Management", Oracle Technology Network, Jul. 2009, 6 pages, <http://www.oracle.com/technetwork/server-storage/solaris10/solaris-memory-135224.html>.*

Craig Zilles, "Accordion Arrays: Selective Compression of Unicode Arrays in Java," ISMM•07, Oct. 2007.

Class DelegatingResourceLocator,[online]; [retrieved Sep. 17, 2010]; http://help.eclipse.org/ganymede/index.jsp? topic=/org.eclipse.emf.doc/references/javadoc/org/eclipse/emf/common/util/DelegatingResourceLocator.html ; Copyright 2001-2006 IBM.

Chen et al., "Heap Compression for Memory-Constrained Java Environments," OOPSLA•03; Oct. 2003.

Developers.sun.com, [online]; [retrieved on Sep. 17, 2010]; Retrieved from the Internet http://web.archive.org/web/20041216120450/java.sun.com/developer/JDCTechTips/2004/tt1214.html John Zukowski, "Resource Bundle Loading," Core Java Technologies: The Source for Developers—Technical Tips, 2004.

Georgios Gousios et al., "Turning Java's Memory Manager for High Performance Server Applications," 2005-2006.

Java.Sun.com, [online]; [retrieved on Oct. 22, 2010]; retrieved from the Internet http://java.sun.com/developer/technicalArticles/Intl/ResourceBundles/ John O'Conner, "Java Internationalization: Localization with ResourceBundles," Oct. 1998.

Kiyokuni Kawachiya et al., "Analysis and Reduction of Memory Inefficiencies in Java Strings," Google; Oct. 2008.

Lucas Jellema, "Testing i18n features of JSF applications Forcing a refresh of the Resource Bundle(s)" [online]; [retrieved on Sep. 17, 2010] http://technology.amis.nl/blog/1360/testing-i18n-features-of-jsf-applications-forcing-a-refresh-of-the-resource-bundles.

Resource Bundle Strings—ICU—International Components for Unicode [online]; [retrieved on Sep. 17, 2010] http://site.icu-project.org/design/size/strings.

IBM [online]; Retrieved from the Internet www-10.lotus.com/ldd/pfwiki.nsf/dx/DB%20Resource%20Bundles%20Sample.../DB%20Resource%20Bundles%20Sample.pdf "Utilizing Database Resource Bundles with IBM WebSphere Portlet Factory," Jul. 2009.

* cited by examiner

MEMORY MANAGEMENT FOR OBJECT ORIENTED APPLICATIONS DURING RUNTIME

BACKGROUND

The present invention relates to object oriented computer applications, and more specifically, to reducing the amount of memory required by object oriented computer applications during runtime.

Java, an objected oriented programming language, is a robust language that provides mechanisms by which complex applications can easily be translated into different languages (e.g., French, English) (Java and all Java-based trademarks and logos are trademarks or registered trademarks of Oracle and/or its affiliates). Language translation is achieved in Java through a type of Java resource called a resource bundle, which is sometimes backed by class definitions or by Java property files. Class definitions and Java property files contain lists of key value pairs where the values are translated into different languages.

While the implementation of the resource bundle has allowed complex applications to be readily translated into many languages, this ease of translation has come with a significant cost to the application and its runtime characteristics. Namely, the amount of memory used by a translated application is far more than is actually needed in order to operate. As such, any large translated Java application requires considerable amounts of computer memory just to load all of the translated strings. Considerable amounts of memory are used because the Java framework handles translations by loading multiple sets of files for each resource bundle, with each file containing a different level of translation specificity (e.g., resource_English_England, resource_English, resource_default). In this example, where the values in the key value pairs are phrases, for any given translated phrase, there are three instances of the keys and the translated phrases are loaded and live in memory for effectively the life of the application once the bundle has been accessed. As the translation is multiplied across a number of bundles in a complex application, a very large amount of Java live heap bytes (or permanent memory for class definitions if the resource bundles were compiled to class files) is allocated just to hold the strings (e.g., the key value pairs).

In addition, in most cases, up to ninety percent of the strings are never used, so the memory is effectively wasted storing unused strings. This retention of strings is inefficient and bloats the memory requirements of Java applications. When products are stacked (i.e., products are built on top of other products), the problem multiplies. A typical stacked application may waste hundreds of megabytes of memory storing strings that are never accessed.

SUMMARY

Embodiments of this memory management are methods, systems and computer program products that include loading an object oriented application into a computer memory. The object oriented application includes a plurality of nodes in a classification tree, the nodes including key value pairs. The nodes are aggregated in the classification tree by a computer. The aggregating includes eliminating redundant keys and creating a composite node. The composite node is loaded into the computer memory. The plurality of nodes in the classification tree are removed from the computer memory in response to loading the composite node into the computer memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein reduce the amount of computer memory required during runtime by object oriented applications that have been coded to support language translation. An example of an application that supports language translation is one that outputs messages in different languages (e.g., French, English, etc.) based on user and/or installation settings. Different languages are supported by the same source code by using a list of key value pairs that vary depending on the target language. Embodiments described herein use Java resource bundles to store hierarchies of key value pairs for different target languages. The hierarchies are aggregated to eliminate duplicate keys, and thus fewer key value pairs are stored in computer memory (also referred to herein as "memory"). Further embodiments described herein store only the key value pairs that have been accessed within a programmable time period and/or with a programmable frequency (e.g. as specified by a programmable threshold). This also leads to a reduced storage requirement during application runtime.

Figure 1:
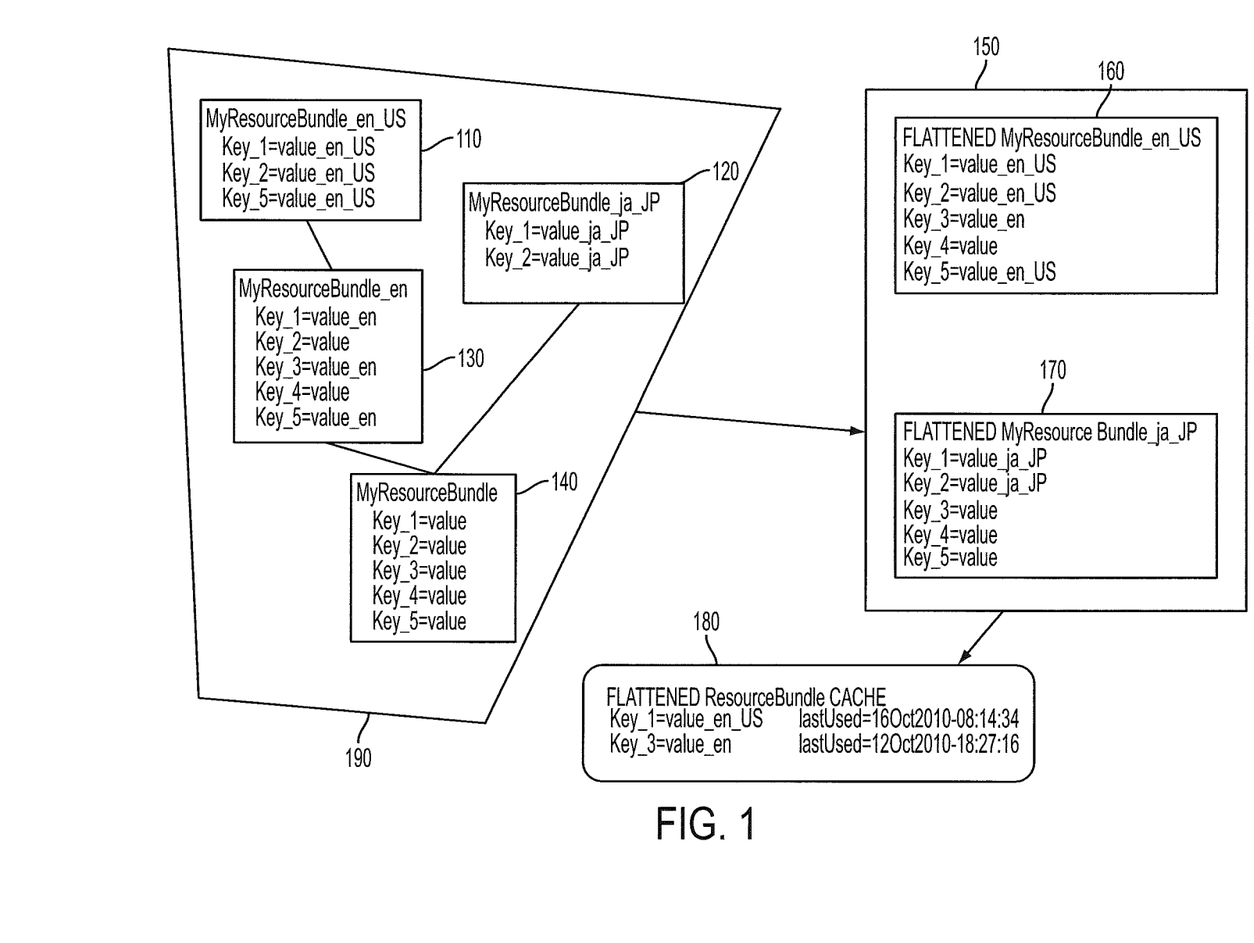
FIG. 1 illustrates a block diagram of an embodiment that includes resource bundles being flattened into flattened resource bundles, as well as a flattened resource bundle cache in which only frequently used keys are retained.

Referring to FIG. 1, a relationship between resource bundles 190 and flattened resource bundles 150 in accordance with an embodiment is generally shown. The resource bundles 190 and flattened resource bundles 150 are used to translate keys that are specified by an application program into Japanese/Japan or English/United States (US) phrases. Thus, the key value pairs in the resource bundles 190 include a key (as specified by an application program) and a value (a phrase in the target language). In an embodiment, the target language is specified by a programmable system and/or user parameter. The resource bundles 190 are used to generate the flattened resource bundles 150. A resource bundle is a class that together with any parent class(es) forms a classification tree made up of nodes in a hierarchical relationship that contain, in this example, key value pairs. Nodes in the resource bundle and any parent classes are aggregated and redundancies between the nodes are eliminated (e.g., by following an inheritance chain) to create a flattened resource bundle that has a single entry for each key. The flattened resource bundle is an example of a composite node. In one embodiment, only those key value pairs (also referred to herein as "strings") that have been recently accessed are stored in cache memory 180. In another embodiment, all of the key value pairs in a flattened resource bundle, such as flattened resource bundle 160, are stored in the cache memory 180.

The resource bundles 190 shown in FIG. 1 include an English/US resource bundle 110, a Japanese/Japan resource bundle 120, an English resource bundle 130, and a default language resource bundle 140. A flattening process (also referred to herein more generally as "aggregating") is implemented to flatten the resource bundles 110, 120, 130, 140 into an English/US flattened resource bundle 160 and a Japanese/Japan flattened resource bundle 170. The common key values for the resource bundles 110, 120, 130, 140 are included in the flattened resource bundles 160, 170, thus reducing the amount of memory required by eliminating the storing of repetitive key values in memory. As such, the English/US flattened resource bundle 160 includes the most specific key values: Key_1=value_en_US; Key_2=value_en_US; and Key_5=value_en_US from the English/US resource bundle 110, thereby eliminating the less specific keys from the English resource bundle 130 and the default language resource bundle 140. The English/US flattened resource bundle 160 also includes the less specific key values: Key_3=value_en from the English resource bundle 130; and Key_4=value from the default language resource bundle 140.

Similarly, the Japanese/Japan flattened resource bundle 170 includes the most specific key values: Key_1=value_ja_JP; and Key_2=value_ja_JP, and thus eliminates the less specific keys from the default language resource bundle 140. In addition, the Japanese/Japan flattened resource bundle 170 also includes the less specific keys from the resource bundle 140. However, the flattened resource bundle 170 includes the less specific key values: Key_3=value; Key_4=value; and Key_5=value from default language resource bundle 140. In this manner, the flattening process reduces repetitive key value pairs from being stored in memory.

In addition, a flattened resource bundle cache memory 180 may be utilized to further reduce the amount of space required for storage of key value pairs in memory. In the example shown in FIG. 1, the flattened resource bundle cache memory 180 includes: Key_1=value_en_US, which was last used at a specified time (e.g., lastUsed=16 Oct. 2010-08:14:34); and Key_3=value_en, which was last used at another specified time (e.g., lastUsed=12 Oct. 2010-18:27:16). In an embodiment, the flattened resource bundle cache memory 180 retains the keys most frequently accessed and/or most recently accessed to further reduce the number of keys retained in memory.

The present exemplary embodiment is specific to a Java application runtime environment, however it will be appreciated that embodiments are not limited to Java applications and that they may be implemented in any object oriented application environment. In addition, the present exemplary embodiment is specific to language translation, however it will be appreciated that embodiments are not limited to language translation and that embodiments may be utilized by any object oriented application that uses keys as placeholders for values to be inserted during application runtime.

Figure 2:
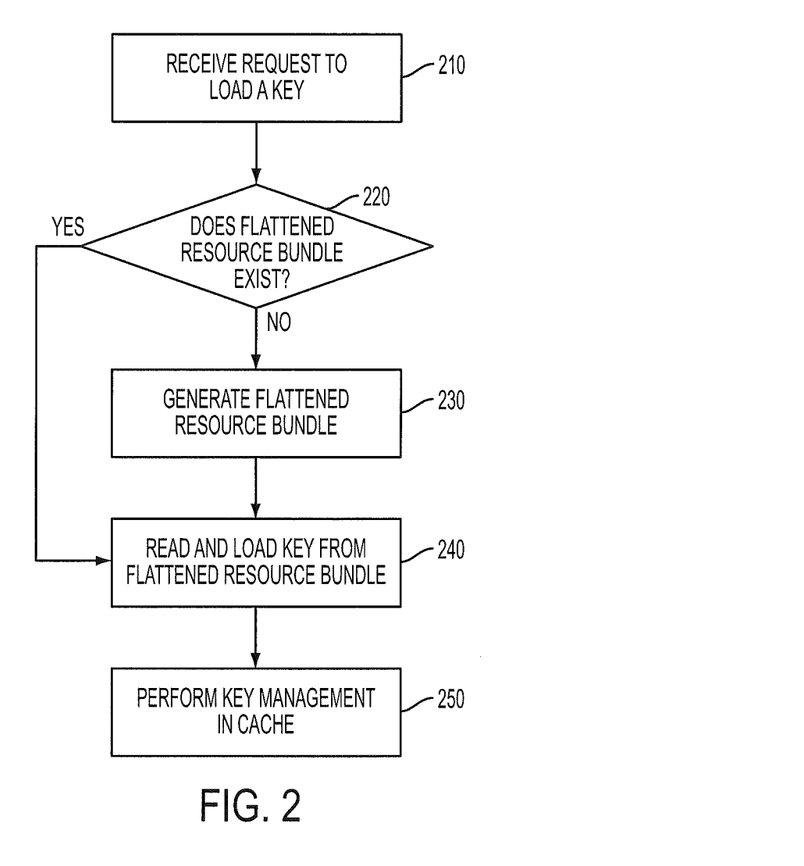
FIG. 2 illustrates a flow chart of memory management for an object oriented application during runtime in accordance with an embodiment.

Referring to FIG. 2, a memory management process is generally shown. The memory management process is performed on a Java virtual machine in a Java runtime environment. A request to load a key located in a resource bundle is received at block 210. A determination about whether a flattened resource bundle exists is made at block 220. If the flattened resource bundle does not exist, then block 230 is performed and a flattened resource bundle is generated, and processing continues at block 240. If the flattened resource bundle does exist, as determined at block 220, then processing continues at block 240. The key (and associated value) is read from the flattened resource bundle at block 240. The key value pair is stored in a cache memory at block 250. The key value pair is kept in the cache memory until the application has completed execution. In another embodiment, the key value pair is kept in the cache memory until a programmable time window has elapsed so that only key value pairs that have been accessed within the time window are stored in cache memory.

For each language translation of a Java application or Java product, a new version of an initial resource bundle is created. For example, if MyResource is created to store all English text, a similarly named file is created to store all French text. Resource bundles use a naming convention that distinguishes the potentially numerous versions of essentially the same bundle. Each bundle name includes a base name and an optional locale identifier. Together, these two pieces uniquely identify a bundle in a package. As such, in the above example, the French version of the resources is named MyResource_fr_FR, and the Canadian French version is named MyResource_fr_CA. In addition, appending the locale name to the base name of the bundle effectively links the bundle's usage to a specific locale. When a bundle is requested using ResourceBundle.getBundle("MyResource"), a getBundle method appends the default locale identifier to the base name and loads the appropriate bundle. If the locale is fr_CA, then a call to ResourceBundle.getBundle("MyResource") will load the MyResource_fr_CA bundle. A user can also pass a specific locale. For example, if a user wants to explicitly load a Japanese bundle, the user can call ResourceBundle.getBundle ("MyResource", new Locale("ja", "JP")). As such, when Java has translated text, Java looks up a resource bundle for language and locale. If a specific language and locale is unavailable, Java falls back to a default (e.g., English and United States). As Java is looking through the resource bundles, each of the resource bundles are loaded and retained in memory, even if Java determines that the language and locales are not needed.

The exemplary embodiments described herein do not load all language sets for a given resource bundle. For example, if a key has a value in the top most translated language set, then the lesser and default translated values of the key are not used and therefore are not loaded into memory. When a load request is made for a bundle, the ResourceBundle loader 'flattens' the resource bundles in the manner described herein.

The memory management described herein may be utilized as a drop-in replacement for the ResourceBundle implementation used by Java applications. The drop-in replacement is an application programming interface (API) compatible implementation that does not retain the complete set of language keys and values in memory at the same time, thereby reducing the load of resource bundles in memory. As such, all the bundles are flattened down into one bundle at load time, thereby leaving only one unique key value pair in memory, which reduces the footprint of a translated bundle in memory. For example, for each translated bundle, there is the language and locale, which may be French and Canada as described herein. In an embodiment, the default language can be English. As such, the Java resource bundle loads the complete set of the French bundle, the complete set of Canadian bundle and the complete set of the English bundle into memory. The drop-in replacement flattens the three bundles into one bundle leaving only one unique key value pairs in memory. In this example, the exemplary drop-in replacement, at minimum, reduces the footprint of a translated bundle by two-thirds. When this example is scaled that across a large application with many bundles, the live bytes savings becomes significant. Automatic bundle flattening can therefore reduce the live memory usage without user intervention.

Exemplary embodiments of this memory management do not retain keys in memory that are not being used. The Java resource bundle only retains a loaded X number of keys that have actually been accessed at least once. Conventionally, the Java resource bundle just loads all strings and keeps them in memory, which is wasteful, especially when up to ninety percent of the keys are never used or displayed. It has been estimated that on average, less than ten percent of the keys most resource bundles typically implement are accessed in an application. As such, large amounts of memory are used for keys and values that are never accessed. As described herein, caching is implemented with the resource bundle to only keep in memory the keys that are currently being actively used. As such, keys that are infrequently (or never) accessed, are removed from memory. Small performance penalties can occur when a new key or one that had been discarded), is requested again, but the memory savings for removing infrequently accessed keys dominate the performance penalty to reload the key and its value.

Known bad keys are cached and marked so that repeated requests for a key that is not in the cache does not trigger a search. In addition, duplicate values across resource bundles in memory can be removed from memory. The values of keys being loaded are analyzed for situations where values are identical for keys in multiple bundles. When located, only one instance of that string value is retained in memory and the other instances are removed from memory for yet more memory savings.

The embodiments described herein can also negate performance penalties from on-demand loading through startup and runtime profiling. Java runtime can determine what keys are accessed early and often, then the bundle loader can be instructed to pre-populate its initial caches with those values on startup, negating the need to do one by one searching. As such, not only are benefits of reduced memory footprint realized, but also benefits of having needed preloaded values being already available, negating search times.

Figure 3:
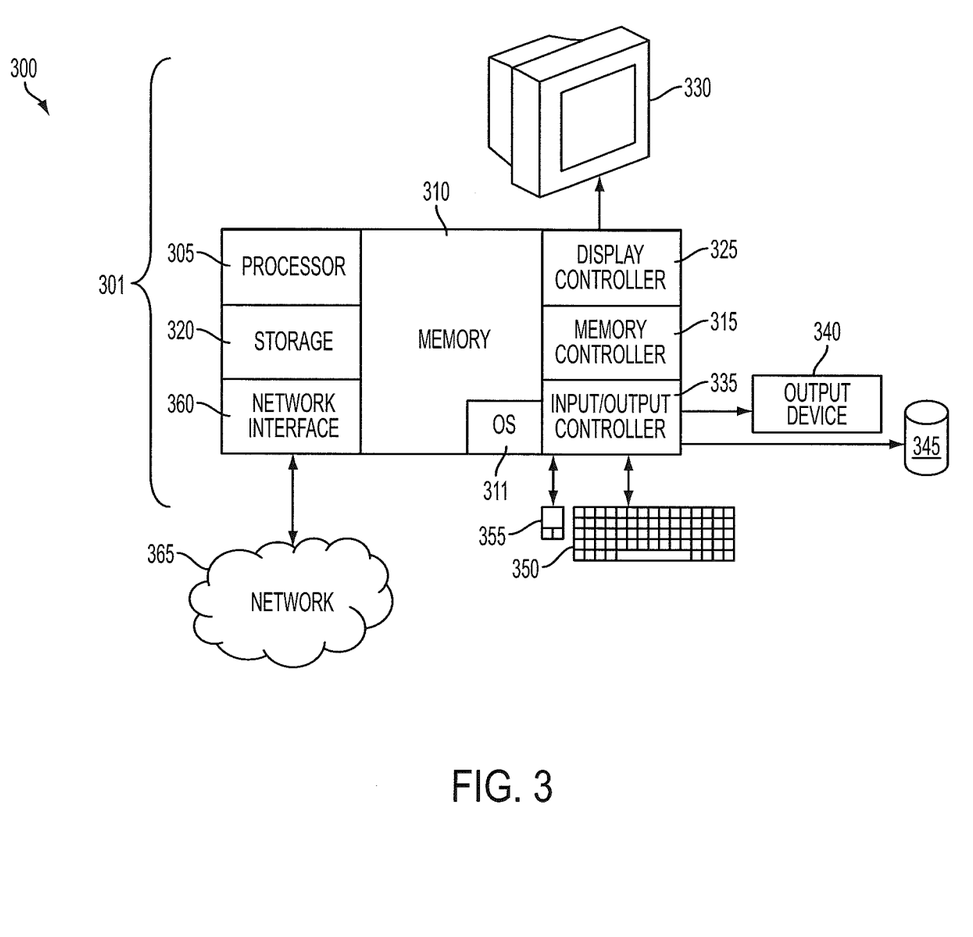
FIG. 3 illustrates an embodiment of a system for performing memory management for an object oriented application during runtime in accordance with an embodiment.

Referring to FIG. 3, a system 300 for memory management of a translated Java application is generally shown. The methods performed by this system can be implemented in software (e.g., firmware), hardware, or a combination thereof. In exemplary embodiments, the methods described herein are implemented in software, as an executable program, that is executed by a special or general-purpose digital computer, such as a personal computer, workstation, minicomputer, or mainframe computer. The system 300 therefore includes general-purpose computer 301.

In terms of hardware architecture, as shown in FIG. 3, the computer 301 includes a processor 305, memory 310 coupled to a memory controller 315, and one or more input and/or output (I/O) devices 340, 345 (or peripherals) that are communicatively coupled via a local input/output controller 335. The input/output controller 335 is implemented by one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly the software stored in memory 310. The processor 305 is implemented by any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 is implemented by any one or a combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305. In an embodiment, the memory includes a cache memory.

The software in memory 310 includes one or more separate programs, each of which comprises an ordered listing of executable instructions for implementing logical functions. The software stored in the memory 310 includes the Java application memory management methods described herein in accordance with exemplary embodiments and a suitable operating system (OS) 311. The operating system 311 essentially controls the execution of other computer programs, such as the Java application memory management systems and methods as described herein, and provides scheduling, input-output control, file and data management, memory management, and communication control and related services.

The Java application memory management methods described herein are in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the Java application memory management methods can be written as an object oriented programming language, which has classes of data and methods, or a procedure programming language, which has routines, subroutines, and/or functions. When written in an object oriented programming language, the resulting object oriented application, when loaded into the memory 310, includes a plurality of nodes in a classification tree.

A conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. The system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, network 365 is a managed IP network administered by a service provider. The network 365 may be implemented in a wireless fashion, e.g., using wireless protocols and technologies, such as WiFi, WiMax, etc. The network 365 can also be a packet-switched network such as a local area network (LAN), wide area network (WAN), metropolitan area network, Internet network, or other similar type of network environment. The network 365 may also be a fixed wireless network, a personal area network (PAN), a virtual private network (VPN), intranet or other suitable network system and includes equipment for receiving and transmitting signals. In an embodiment, the network is implemented by a combination of two or more different networks.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The Java application memory management methods described herein and the OS 311, in whole or in part, but typically the latter, are read by the processor 305, perhaps buffered within the processor 305, and then executed.

When the embodiments described herein are implemented in software, the program instructions are stored on any computer readable medium, such as storage 320, for use by or in connection with any computer related system or method.

Technical effects and benefits include the ability to implement an application having base source code that can be adapted to different languages without requiring a rewrite or a high overhead in terms of memory usage during runtime. Embodiments described herein provide further benefits by providing memory management that reduces the live heap bytes and class bytes of translated Java applications. Memory footprints are reduced by flattening resource bundles at load time, and by reducing multiple keys and value pairs to a single key value pair in memory. In addition, infrequently accessed keys are removed from memory and memory is pre-populated with known frequently used keys to further reduce memory footprint and search times for keys.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the Java application memory management methods are implemented in hardware, the Java application memory management methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A memory management method comprising:
    loading an object oriented application into a computer memory, the object oriented application including a plurality of nodes in a classification tree, the nodes including key value pairs;
    aggregating the nodes in the classification tree, the aggregating performed by a computer, the aggregating including:
    eliminating redundant keys; and
    creating a composite node; wherein the composite node comprises key value pairs for translating a key value into a phrase in a selected language, wherein the language is selected prior to loading the object oriented application into the computer memory;
    loading the composite node into the computer memory; and
    removing the plurality of nodes in the classification tree from the computer memory in response to loading the composite node into the computer memory.

2. The method of claim 1, further comprising:
    determining a frequency of access of a key value pair in the composite node; and
    removing the key value pair from the computer memory in response to the frequency of access being below a programmable threshold.

3. The method of claim 1, further comprising removing duplicate key value pairs from the computer memory.

4. The method of claim 1, wherein the eliminating redundant keys comprises following an inheritance chain in the classification tree to obtain a value for each key value pair.

5. The method of claim 1, wherein the computer memory is a cache memory.

6. The method of claim 1, wherein the aggregating, loading, and removing are performed in response to a request to load a key from the classification tree.

7. The method of claim 1, wherein the object oriented language is Java, the classification tree comprises a plurality of Java resource bundles, and the composite node comprises a flattened resource bundle.

8. A computer program product for memory management, the computer program product comprising: a non-transitory storage medium readable by a processing circuit and storing instructions for execution by the processing circuit for performing a method comprising:
    loading an object oriented application into a computer memory, the object oriented application including a plurality of nodes in a classification tree, the nodes including key value pairs;

aggregating the nodes in the classification tree, the aggregating performed by a computer, the aggregating including:
eliminating redundant keys; and
creating a composite node; wherein the composite node comprises key value pairs for translating a key value into a phrase in a selected language, wherein the language is selected prior to loading the object oriented application into the computer memory;
loading the composite node into the computer memory; and
removing the plurality of nodes in the classification tree from the computer memory in response to loading the composite node into the computer memory.

9. The computer program product of claim 8, wherein the method further comprises:
determining a frequency of access of a key value pair in the composite node; and
removing the key value pair from the computer memory in response to the frequency of access being below a programmable threshold.

10. The computer program product of claim 8, wherein the method further comprises removing duplicate key value pairs from the computer memory.

11. The computer program product of claim 8, wherein the computer memory is a cache memory.

12. The computer program product of claim 8, wherein the aggregating, loading, and removing are performed in response to a request to load a key from the classification tree.

13. The computer program product of claim 8, wherein the object oriented language is Java, the classification tree comprises a plurality of Java resource bundles, and the composite node comprises a flattened resource bundle.

14. A system for performing memory management, the system comprising: a computer memory; and a processor in communication with the computer memory, the processor configured to perform a method, the method comprising:
loading an object oriented application into a computer memory, the object oriented application including a plurality of nodes in a classification tree, the nodes including key value pairs;
aggregating the nodes in the classification tree, the aggregating performed by a computer, the aggregating including:
eliminating redundant keys; and
creating a composite node; wherein the composite node comprises key value pairs for translating a key value into a phrase in a selected language, wherein the language is selected prior to loading the object oriented application into the computer memory;
loading the composite node into the computer memory; and
removing the plurality of nodes in the classification tree from the computer memory in response to loading the composite node into the computer memory.

15. The system of claim 14, wherein the method further comprises:
determining a frequency of access of a key value pair in the composite node; and
removing the key value pair from the computer memory in response to the frequency of access being below a programmable threshold.

16. The system of claim 14, wherein the aggregating, loading, and removing are performed in response to a request to load a key from the classification tree.

17. The system of claim 14, wherein the computer memory is a cache memory.

18. The system of claim 14, wherein the object oriented language is Java, the classification tree comprises a plurality of Java resource bundles, and the composite node comprises a flattened resource bundle.

* * * * *